US012567260B2

(12) United States Patent (10) Patent No.: US 12,567,260 B2
Hatori (45) Date of Patent: Mar. 3, 2026

(54) VIDEO TRANSMISSION SYSTEM, VEHICLE, AND VIDEO TRANSMISSION METHOD

(71) Applicant: TOYOTA JIDOSHA KABUSHIKI KAISHA, Toyota (JP)

(72) Inventor: Takayuki Hatori, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 441 days.

(21) Appl. No.: 18/120,854

(22) Filed: Mar. 13, 2023

(65) Prior Publication Data

US 2023/0306749 A1 Sep. 28, 2023

(30) Foreign Application Priority Data

Mar. 24, 2022 (JP) ................................. 2022-048297

(51) Int. Cl.
*G06V 20/56* (2022.01)
(52) U.S. Cl.
CPC .................................... *G06V 20/56* (2022.01)
(58) Field of Classification Search
CPC ......... H04N 21/41422; H04N 21/2365; G06V 20/56
See application file for complete search history.

(56) References Cited

U.S. PATENT DOCUMENTS

| | | | |
|---|---|---|---|
| 10,926,715 B1 * | 2/2021 | Soler ....................... | H04N 23/90 |
| 11,529,916 B1 * | 12/2022 | Karadeniz .............. | G08C 15/06 |
| 2010/0039494 A1 | 2/2010 | Horihata et al. | |
| 2019/0174623 A1 | 6/2019 | Owaki | |
| 2019/0208237 A1 * | 7/2019 | Harish ..................... | H04L 65/80 |
| 2022/0274606 A1 | 9/2022 | Matsuo et al. | |
| 2022/0368860 A1 * | 11/2022 | Shinohara .............. | G06V 20/56 |

FOREIGN PATENT DOCUMENTS

| | | |
|---|---|---|
| JP | 2004128953 A | 4/2004 |
| JP | 2005-328479 A | 11/2005 |
| JP | 2008-205594 A | 9/2008 |
| JP | 2019-083450 A | 5/2019 |
| JP | 2020-137078 A | 8/2020 |
| JP | 2021-081886 A | 5/2021 |
| WO | 2018/047491 A1 | 3/2018 |

* cited by examiner

*Primary Examiner* — Rebecca A Volentine
(74) *Attorney, Agent, or Firm* — Oliff PLC

(57) ABSTRACT
A video transmission system includes a first transmitter that multiplexes two or more first video signals using a first video transmission standard to produce a second video signal, a second transmitter that multiplexes a third video signal and the second video signal using a second video transmission standard different from the first video transmission standard to produce a fourth video signal, a first receiver that receives the fourth video signal transmitted through a single cable and separates the second video signal and the third video signal, and a second receiver that demultiplexes the second video signal to separate the two or more first video signals.

9 Claims, 13 Drawing Sheets

[Fig. 1]
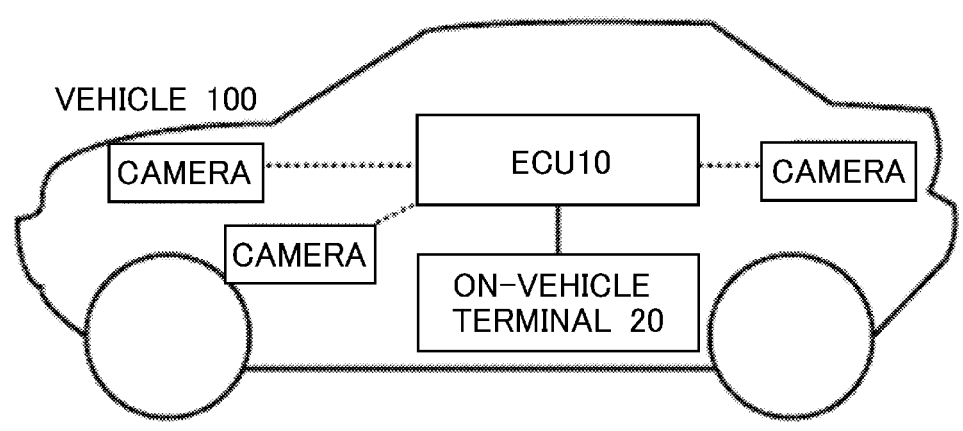
[Fig. 2A]
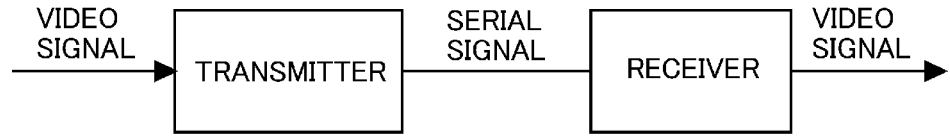
[Fig. 2B]
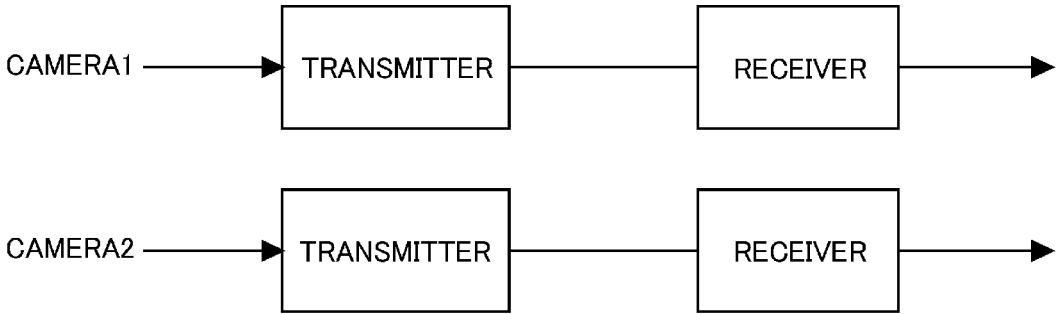

[Fig. 2C]
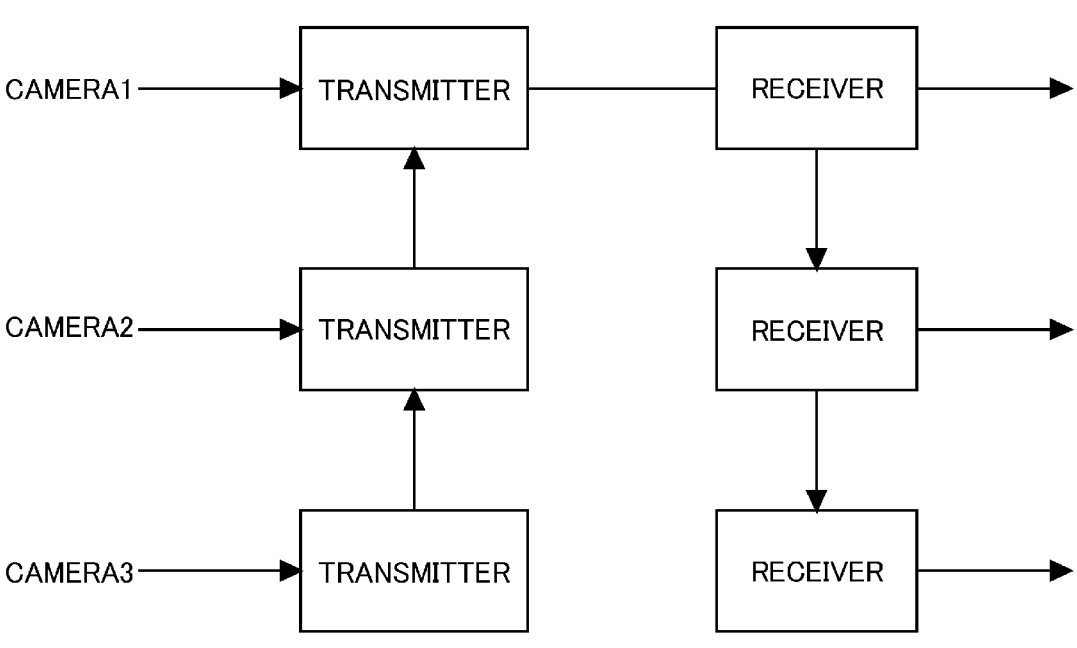
[Fig. 3]
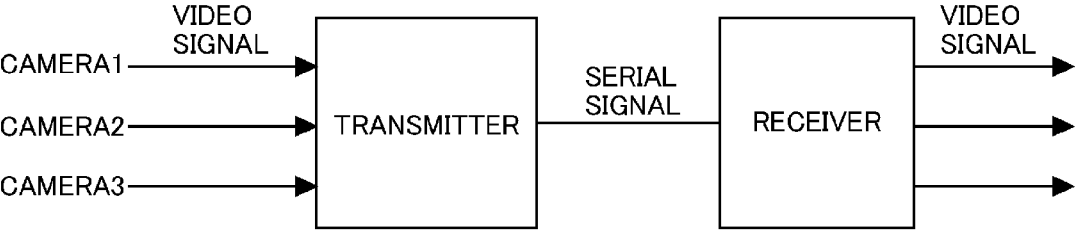
[Fig. 4A]
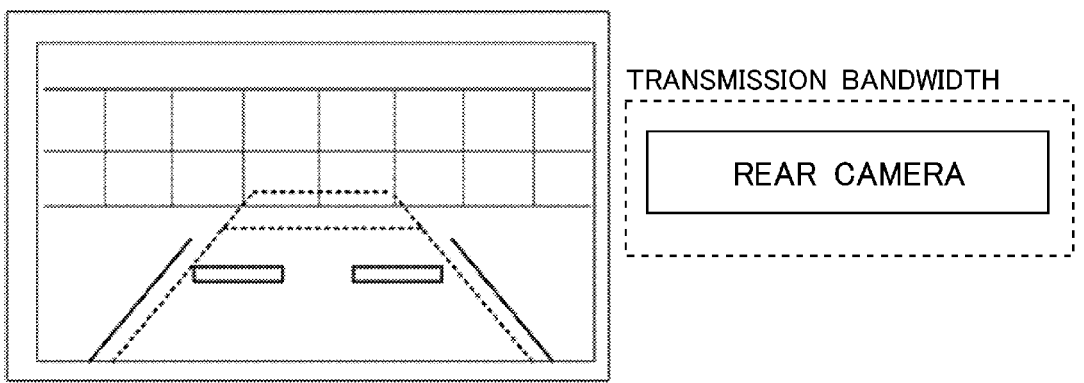

[Fig. 4B]
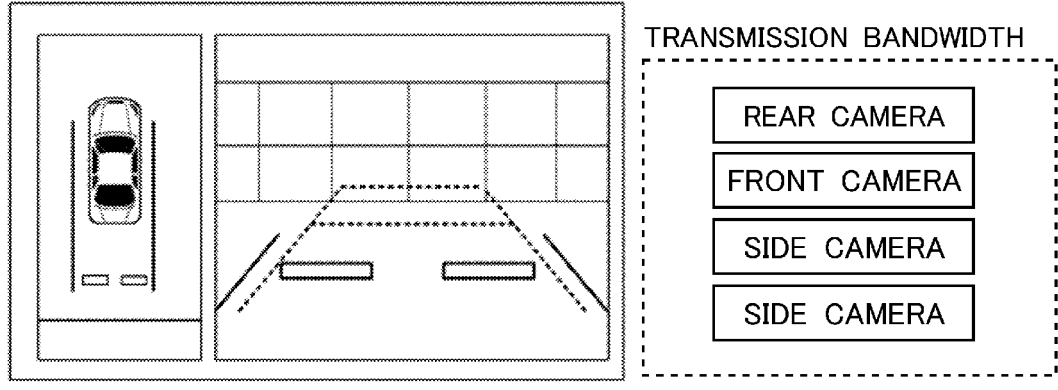
[Fig. 5]
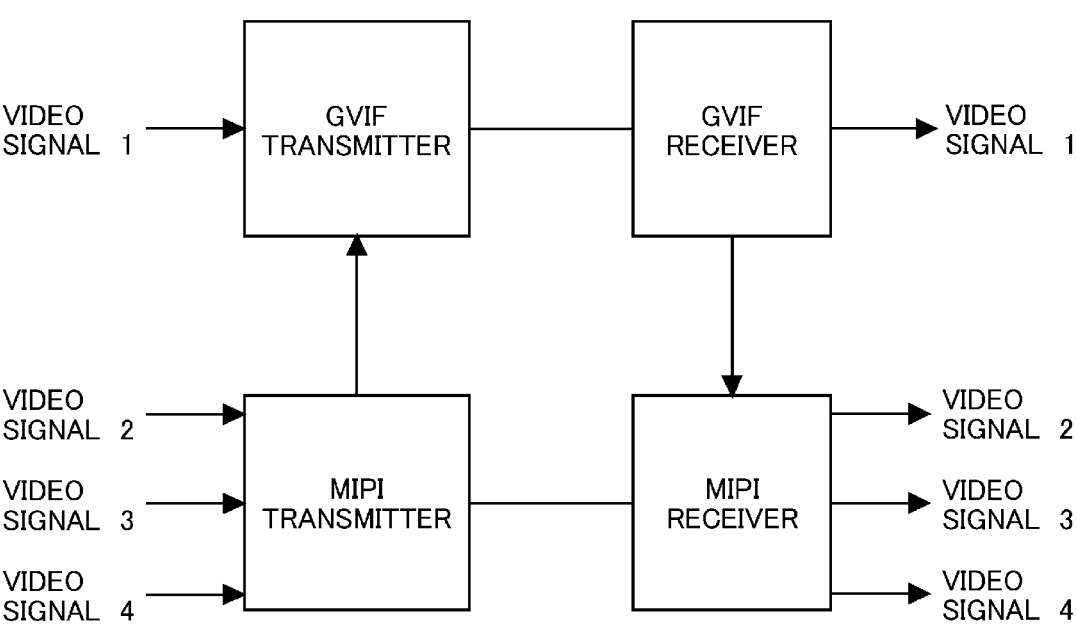

VIDEO SIGNAL 1
(REAR CAMERA)

| VIDEO SIGNAL 2 | VIDEO SIGNAL 3 | VIDEO SIGNAL 4 |

601

602

[Fig. 7]
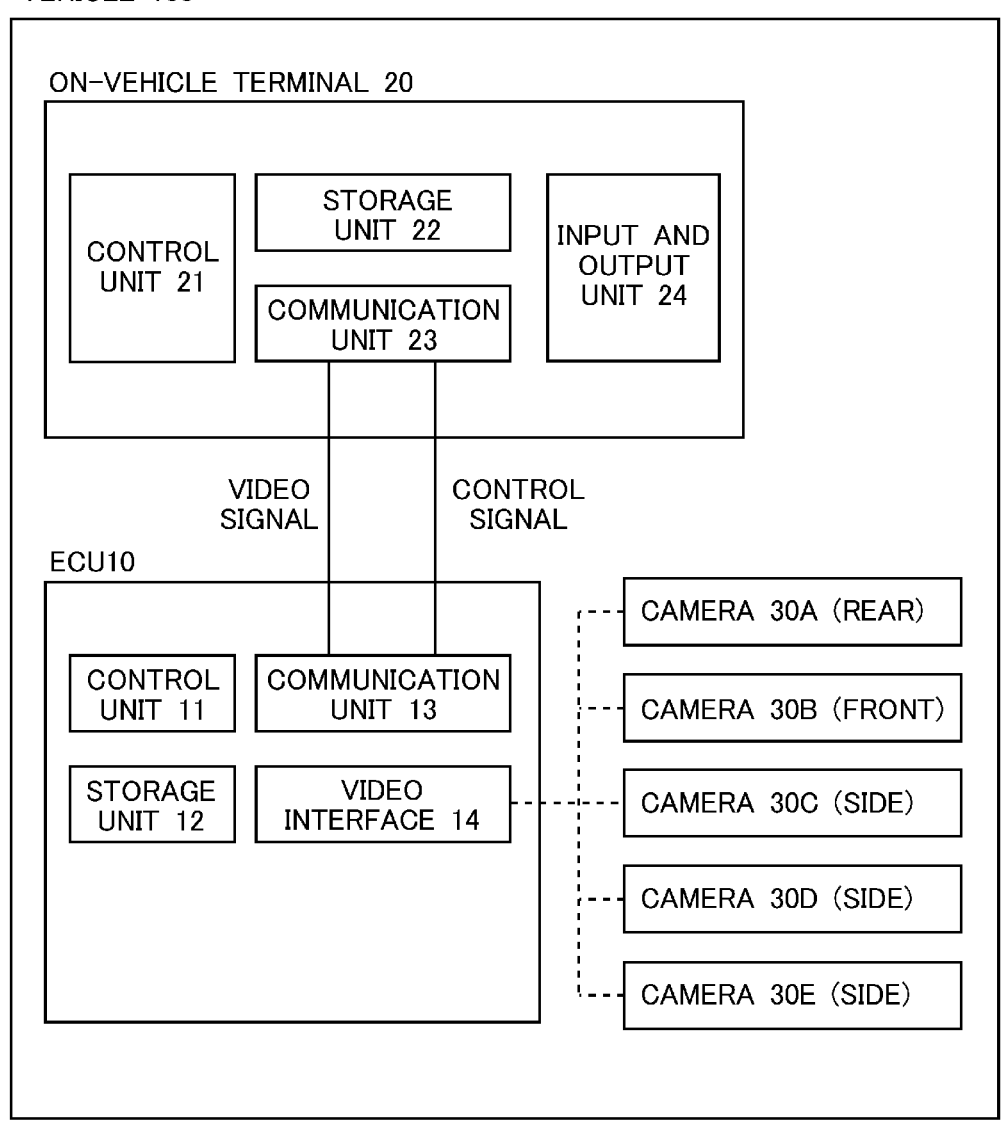

[Fig. 8]
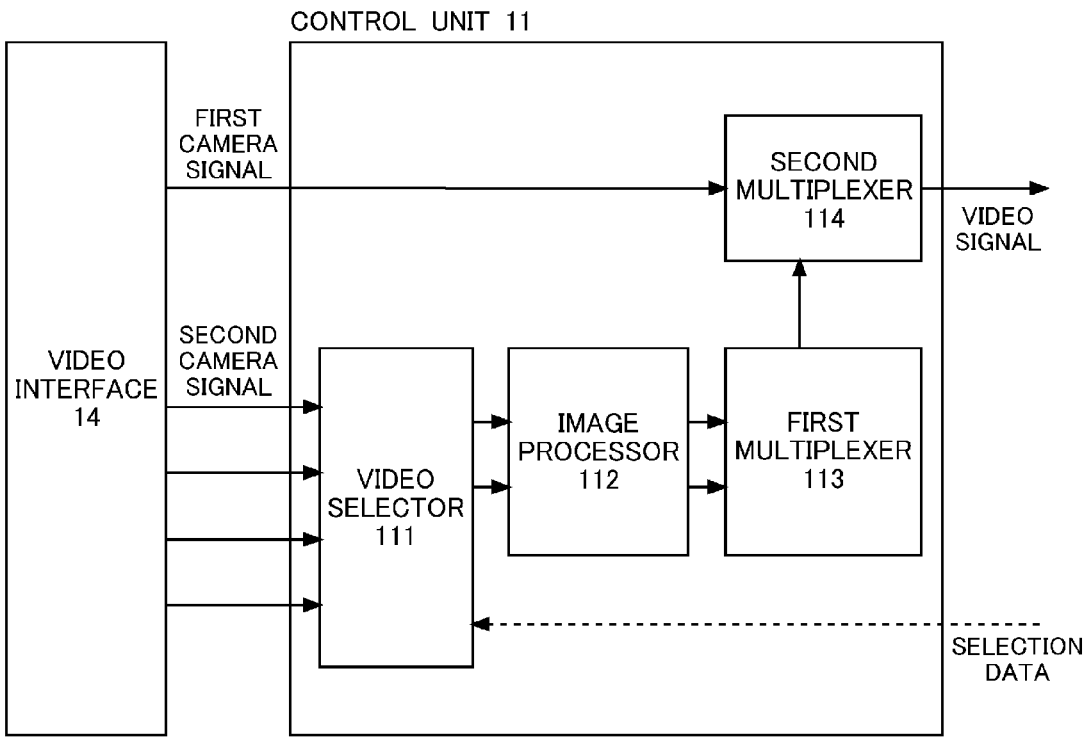

[Fig. 9A]

| |
|---|
| CAMERA |
| REAR  CAMERA |
| LEFT  FRONT  SIDE  CAMERA |
| RIGHT  FRONT  SIDE  CAMERA |
| FRONT  CAMERA |

[Fig. 9B]

| CAMERA | DEGREE OF PRIORITY |
|---|---|
| REAR  CAMERA | 1 |
| LEFT  FRONT  SIDE  CAMERA | 2 |
| RIGHT  FRONT  SIDE  CAMERA | 2 |
| FRONT  CAMERA | 2 |

[Fig. 10]
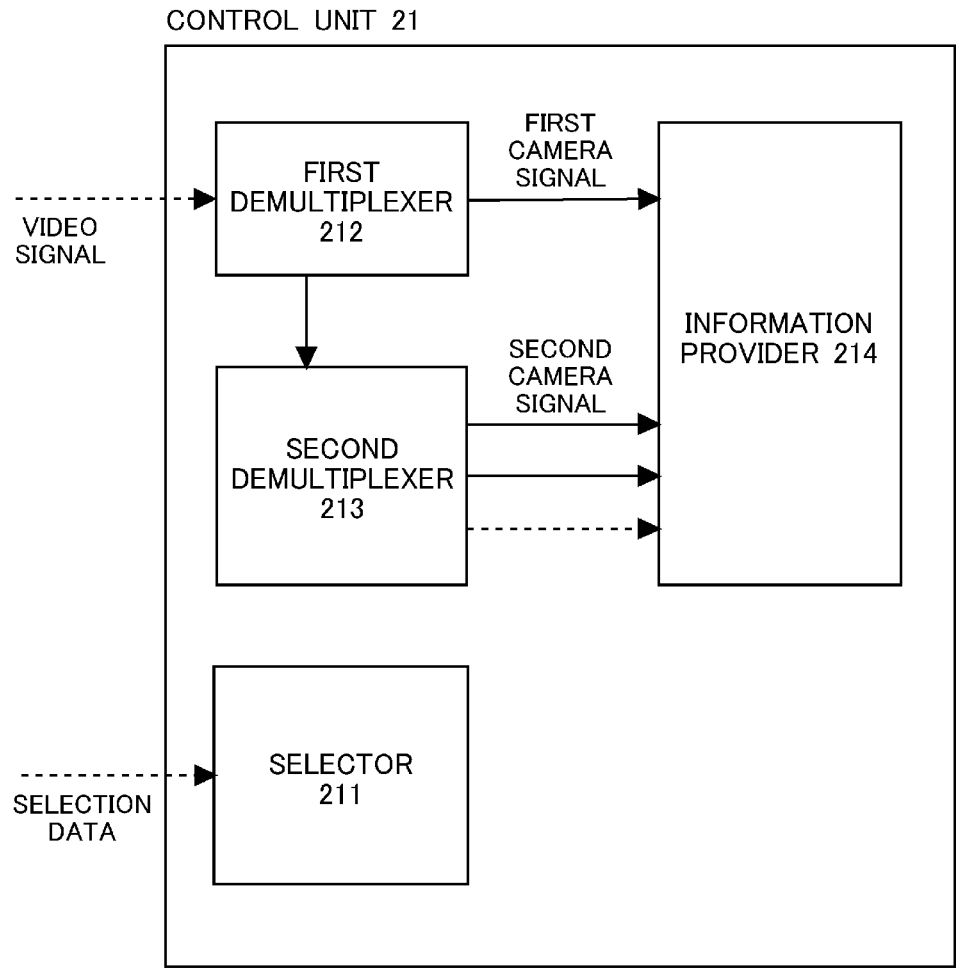

[Fig. 11]

| STATUS OF VEHICLE | REQUIRED VIDEO | CAMERA USED |
|---|---|---|
| MOVING REARWARD | VIDEO SHOWING SCENE BEHIND VEHICLE | REAR CAMERA |
| | ALL-AROUND VIDEO | ALL CAMERAS FOR MONITORING OUTSIDE |
| LOCATED AT INTERSECTION WITH LOW VISIBILITY | VIDEO OF SCENE ON SIDE OF VEHICLE | FRONT SIDE CAMERA |
| ALL-AROUND MONITOR ACTIVATED | ALL-AROUND VIDEO | ALL CAMERAS FOR MONITORING OUTSIDE |
| RUNNING | VIDEO MONITORING DRIVER | DRIVER CAMERA |

[Fig. 12]
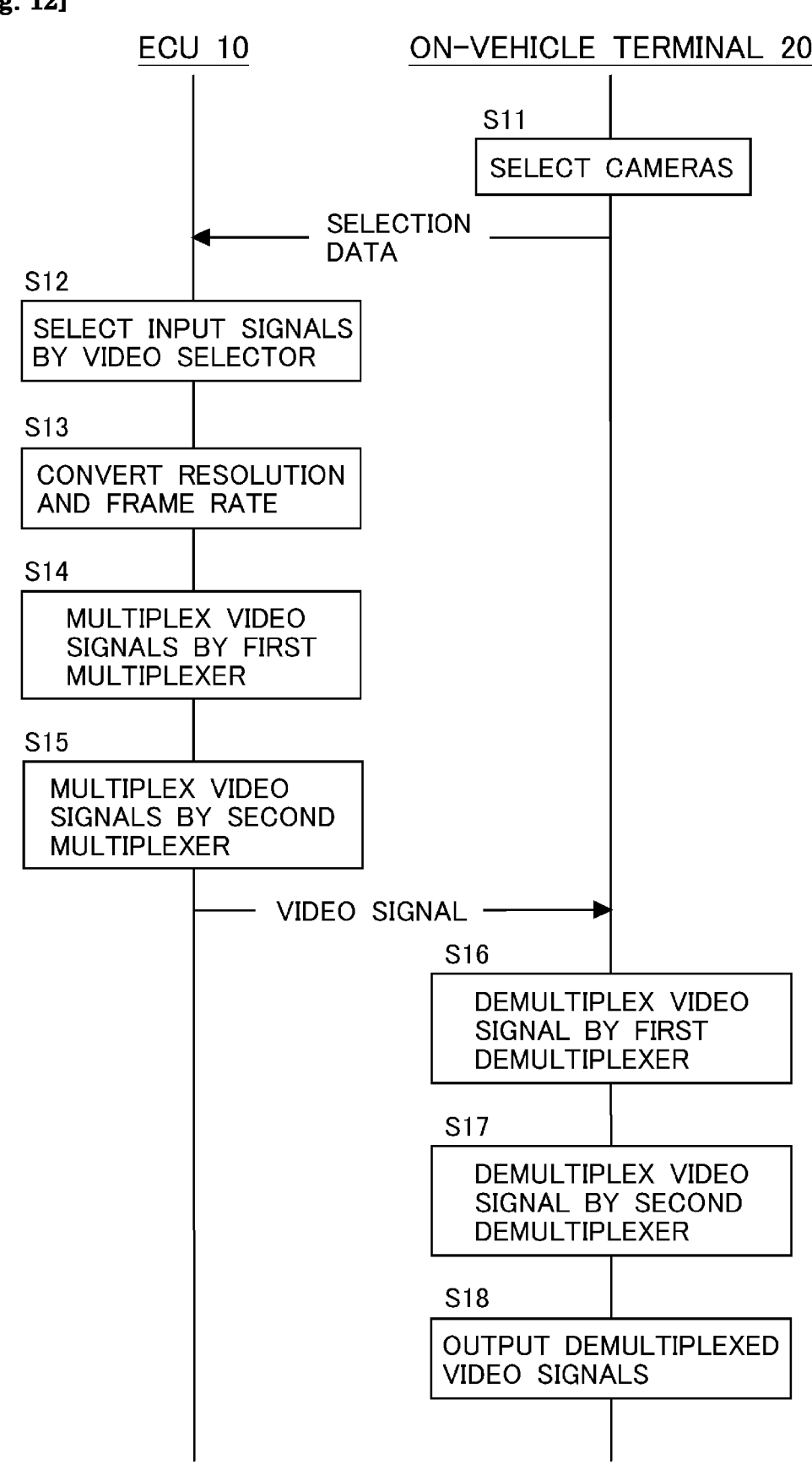

[Fig. 13]
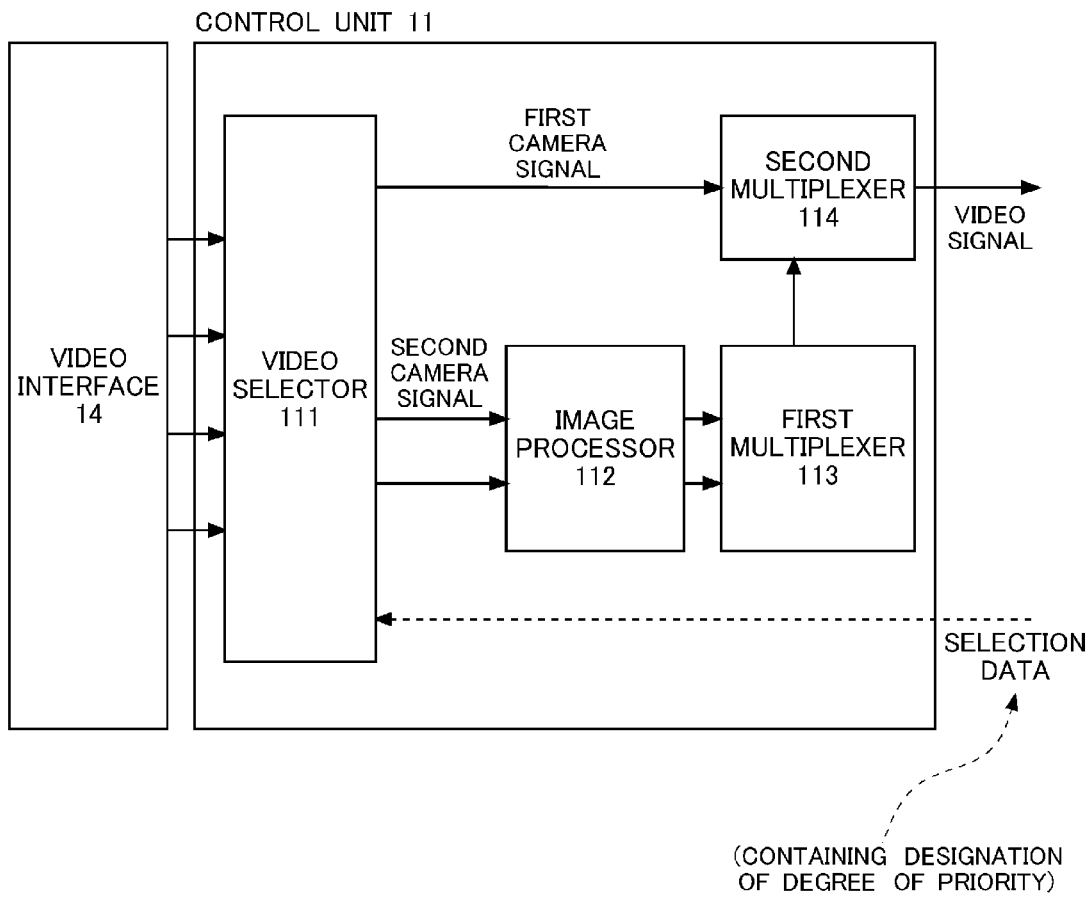

[Fig. 14]
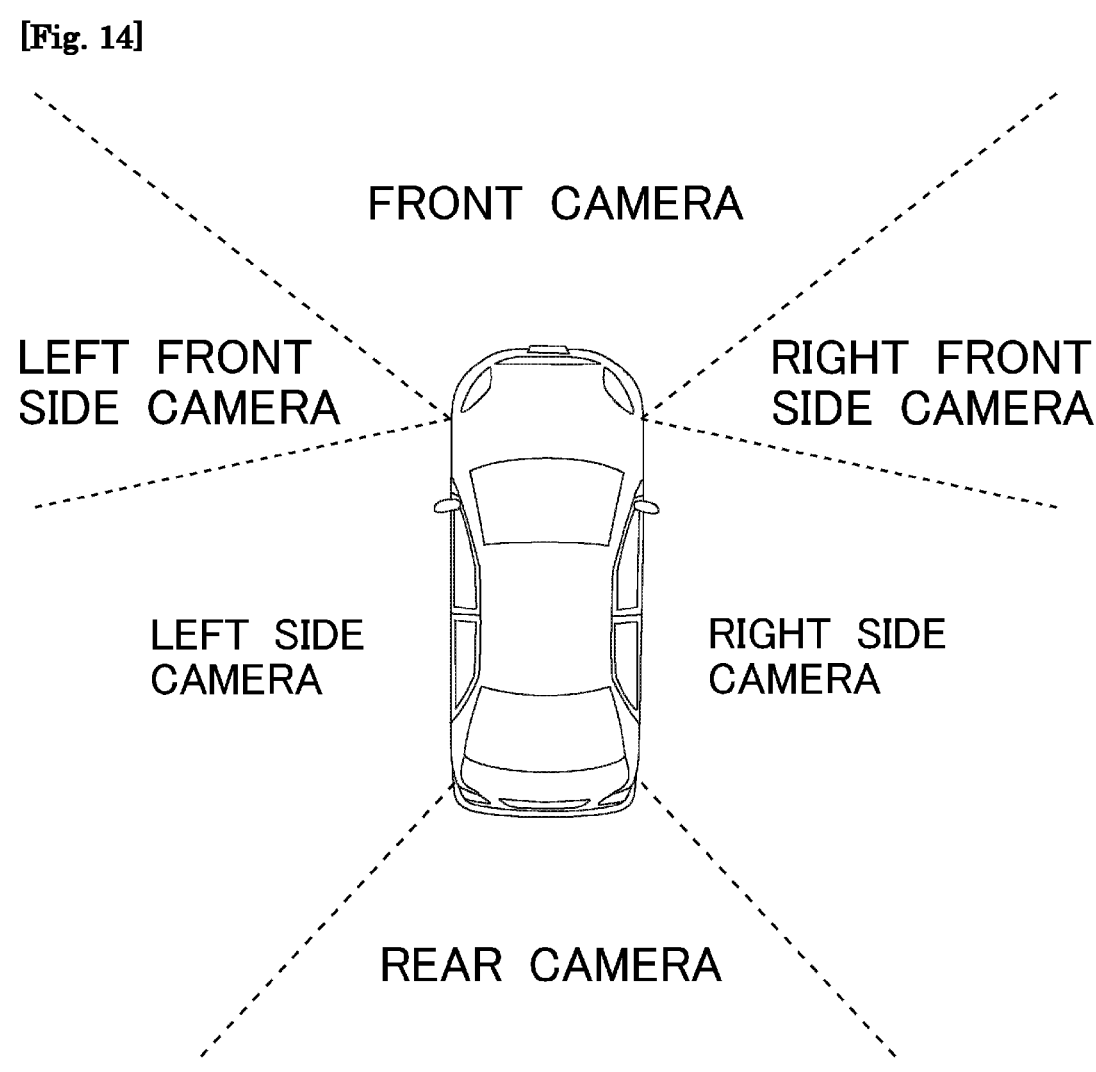

VIDEO TRANSMISSION SYSTEM, VEHICLE, AND VIDEO TRANSMISSION METHOD

CROSS REFERENCE TO THE RELATED APPLICATION

This application claims the benefit of Japanese Patent Application No. 2022-48297, filed on Mar. 24, 2022, which is hereby incorporated by reference herein in its entirety.

BACKGROUND

Technical Field

The present disclosure relates to video transmission.

Description of the Related Art

There are technologies for improving the efficiency of video transmission. For example, Patent Document 1 in the citation list below discloses a system connected with a plurality of cameras that achieves efficient video transmission by multiplexing video signals.

CITATION LIST

Patent Literature

Patent Literature 1: Japanese Patent Application Laid-Open No. 2005-328479.

SUMMARY

An object of this disclosure is to transmit a plurality of videos or video signals efficiently.

In one aspect of the present disclosure, there is provided a video transmission system comprising a first transmitter that multiplexes two or more first video signals using a first video transmission standard to produce a second video signal, a second transmitter that multiplexes a third video signal and the second video signal using a second video transmission standard different from the first video transmission standard to produce a fourth video signal, a first receiver that receives the fourth video signal transmitted through a single cable and separates the second video signal and the third video signal, and a second receiver that demultiplexes the second video signal to separate the two or more first video signals.

In another aspect of the present disclosure, there is provided a vehicle comprising a plurality of cameras that captures images of scenes outside the vehicle, a first apparatus that multiplexes two or more first video signals using a first video transmission standard to produce a second video signal and multiplexes a third video signal and the second video signal using a second video transmission standard different from the first video transmission standard to produce a fourth video signal, and a second apparatus that receives the fourth video signal transmitted through a single cable, separates the second video signal and the third video signal, and demultiplexes the second video signal to separate the two or more first video signals.

In other aspects of the present disclosure, there are also provided a method implemented by the above system or vehicle, a program configured to cause a computer to implement the method, or a computer readable storage medium in which the program is stored in a non-transitory manner.

According to the present disclosure, it is possible to achieve efficient transmission of a plurality of video signals.

BRIEF DESCRIPTION OF THE DRAWINGS

FIG. 1 is a diagram illustrating the general configuration of a vehicle system according to an embodiment.

FIG. 2A is a first diagram schematically illustrating a system for multiplexing video signals based on GVIF.

FIG. 2B is a second diagram schematically illustrating a system for multiplexing video signals based on GVIF.

FIG. 2C is a third diagram schematically illustrating a system for multiplexing video signals based on GVIF.

FIG. 3 is a diagram schematically illustrating a system for multiplexing video signals based on MIPI.

FIG. 4A is a diagram illustrating a first example of an image displayed by an on-vehicle terminal 20 during backward movement of a vehicle.

FIG. 4B is a diagram illustrating a second example of an image displayed by the on-vehicle terminal 20 during backward movement of the vehicle.

FIG. 5 is a diagram schematically illustrating processing executed by a video transmission system according to a first embodiment.

FIG. 6 is a diagram schematically illustrating a video signal transmitted between an ECU 10 and the on-vehicle terminal 20.

FIG. 7 is a block diagram illustrating an exemplary configuration of a vehicle 100.

FIG. 8 is a diagram illustrating functional modules of a control unit 11 and data flows between modules.

FIG. 9A illustrates a first example of selection data transmitted from the on-vehicle terminal 20.

FIG. 9B illustrates a second example of selection data transmitted from the on-vehicle terminal 20.

FIG. 10 is a diagram illustrating functional modules of a control unit 21 and data flows between modules.

FIG. 11 illustrates an example of data used by the on-vehicle terminal 20 in selecting cameras.

FIG. 12 is a flow chart of processing executed by the ECU 10 and the on-vehicle terminal 20.

FIG. 13 is a diagram illustrating modules of the control unit 11 according to a second embodiment.

FIG. 14 is a diagram illustrating the positions of cameras provided in a vehicle.

DESCRIPTION OF THE EMBODIMENTS

Use of various on-vehicle cameras has been increasing. Examples of on-vehicle cameras include drive recorders, rear cameras, side cameras, stereo cameras for autonomous driving, and cameras used to monitor drivers. FIG. 14 illustrates examples of cameras that are provided outside a vehicle. The vehicle illustrated in FIG. 14 is provided with a plurality of cameras to enable multi-directional monitoring. These cameras are connected to an electronic control unit (ECU) that manages videos. The electronic control unit is connected also with other on-vehicle apparatuses (e.g. a navigation apparatus).

To transmit videos, a specific video transmission standard is used. Examples of the video transmission standard include GVIF (Gigabit Video Interface, registered trademark) and MIPI (Mobile Industry Processer Interface, registered trademark).

Videos can be transmitted by modules that transmit and receive videos and a cable that connects the modules. However, increases in the number of cameras provided in a vehicle can lead to the problem of increased numbers of modules used to transmit and receive videos and cables.

One countermeasure to this problem is multiplexed transmission of video signals. Multiplexed transmission of video signals enables a reduction in the numbers of modules used to transmit and receive videos and cables.

However, increases in the number of multiplexed video signals may require an increased amount of hardware and increased cost. Although there are standards that allow multiplexing of a plurality of videos by a single piece of hardware, it is necessary to make the resolutions and the frame rates of videos uniform. For this reason, such standards are not suitable for use with a vehicle provided with various types of cameras. Another problem is that multiplexing of video signals involves a decrease in the bitrate, which can lead to deteriorated video quality including deteriorated image quality. In particular, videos that affect safety (e.g. videos of rear cameras) must meet established quality requirements, and deterioration in video quality (or deterioration in image quality) is not allowed for such videos in some cases.

The video transmission system disclosed herein enables multiplexed transmission of a plurality of videos while meeting quality requirements.

In an aspect, the present disclosure pertains to a video transmission system.

Specifically, the video transmission system includes a first transmitter that multiplexes two or more first video signals using a first video transmission standard to produce a second video signal, a second transmitter that multiplexes a third video signal and the second video signal using a second video transmission standard different from the first video transmission standard to produce a fourth video signal, a first receiver that receives the fourth video signal transmitted through a single cable and separates the second video signal and the third video signal, and a second receiver that demultiplexes the second video signal to separate the two or more first video signals.

The two or more first video signals and the third video signal are transmitted between different apparatuses through a single cable. In cases where the video transmission system is applied to a vehicle, the two or more first video signals and the third video signal may be video signals produced by cameras provided on the vehicle.

The first transmitter multiplexes the two or more first video signals to produce the second video signal. Then, the second transmitter further multiplexes the second video signal and the third video signal to produce the fourth video signal.

The video transmission standard used by the first transmitter and the video transmission standard used by the second transmitter are different from each other.

For example, the first transmitter multiplexes the two or more first video signals using the first video transmission standard with which a plurality of video signals can be multiplexed. The resultant second video signal is transmitted to the second transmitter, where the second video signal and the third video signal are multiplexed. In this multiplexing, the second transmitter uses the second video transmission standard to produce the fourth video signal.

The first and second receivers demultiplex (or separate) the multiplexed signals through reverse procedures. Specifically, the fourth video signal is demultiplexed into the third video signal and the second video signal using the second video transmission standard. Then, the second video signal is demultiplexed into the two or more first video signals using the first video transmission standard.

In this way, it is possible to multiplex and demultiplex (or separate) video signals using a plurality of different video transmission standard in combination.

Multiplexed transmission of video signals using a single video transmission standard suffers from some problems. One problem is that variations in the number of transmitted video signals lead to variations in the bandwidth allotted to each video signal, leading to variations in the quality of video images. Another problem is that it is difficult to transmit video signals of different resolutions or different frame rates.

Mixed use of a plurality of different video transmission standards enables simultaneous transmission of a plurality of video signals of different resolutions or different frame rates while meeting quality requirements placed on the video images.

In the following, specific embodiments of the technology disclosed herein will be described with reference to the drawings. The hardware configurations, the module configurations, the functional configurations, and other features that will be described in connection with the embodiments are not intended to limit the technical scope of the disclosure only to them, unless stated otherwise.

First Embodiment

A vehicle system according to a first embodiment will be described with reference to FIG. 1. The vehicle system according to the first embodiment includes a vehicle 100.

The vehicle 100 is an automobile provided with a plurality of cameras. Examples of the cameras include a rear camera, a side camera, a camera for a drive recorder, a camera for autonomous driving, and a camera for monitoring the driver.

The vehicle 100 may be a vehicle that is configured to enable a person on the driver's seat to monitor the surrounding environment of the vehicle. The autonomous vehicle 100 may be a vehicle that is capable of driving autonomously or semi-autonomously. The cameras provided in the vehicle 100 are connected to an ECU 10.

The ECU 10 is an electronic control unit that processes video signals produced by the cameras. The ECU 10 will also be referred to as the camera ECU.

The ECU 10 is configured to receive video signals from the cameras. The ECU 10 is capable of selecting video signals in response to requests made by other electronic control units and an on-vehicle terminal 20 and providing the selected videos to them. While FIG. 1 shows only one ECU, the vehicle 100 may be provided with other ECUs. Examples of the other ECUs include an engine ECU, a body ECU, an autonomous driving ECU, and a power control ECU. The ECU 10 may be either one that manages or processes only videos captured by the cameras or one that performs other processing (e.g. autonomous driving and/or driver assist etc.) based on videos captured by the cameras as well.

The on-vehicle terminal 20 is an information terminal provided on the vehicle 100. The on-vehicle terminal 20 is also called an infotainment terminal, which has the function of providing information (e.g. traffic information and route guide) and entertainment (e.g. music and video) to occupants of the vehicle. The on-vehicle apparatus 20 may be either an apparatus that works alone (such as a car navigation apparatus) or an apparatus configured to cooperate with a smartphone or the like.

The on-vehicle terminal 20 may be configured to be capable of communicating with a network through a communication module.

The on-vehicle terminal 20 is configured to be capable of outputting video images captured by cameras according to the status of the vehicle. For example, when the gear is in the reverse position, the on-vehicle terminal 20 may receive the video image captured by the rear camera from the ECU 10 and output it through a display. When the speed of the vehicle 100 is lower than a certain speed and the vehicle 100 is located at an intersection with low visibility, the on-vehicle terminal 20 may receive video images captured by the left and right front side cameras from the ECU 10 and output them through the display.

The on-vehicle terminal 20 may be configured to be capable of outputting video images of cameras in response to operations conducted by the driver. For example, when the function of monitoring the environment all around the vehicle is activated, the on-vehicle terminal 20 may receive video images captured by multiple cameras from the ECU 10, composite them to create a video image as a view seen from above the vehicle 100, and output it through the display. This composite video image will be hereinafter referred to as the all-around video image.

Here, we will discuss problems encountered with transmission of video signals.

Transmission of video signals inside a vehicle (e.g. transmission between the ECU 10 and the on-vehicle terminal 20) can be performed using a specific video transmission standard. An example of the video transmission standard is GVIF (Gigabit Video Interface, registered trademark). In the case where GVIF is used, video signals can be transmitted at high speed through a single cable.

FIG. 2A is a diagram schematically illustrating a system for transmitting video signals based on GVIF. This system can transmit a video signal by serializing it by a transmitter. The serialized signal is deserialized by a receiver to recover the video signal.

In the case where video signals are produced by a plurality of cameras, it is sometimes necessary to transmit them collectively. This is the case, for example, when videos of a plurality of cameras that capture images of the surroundings of a vehicle are transmitted all together in order to create an all-around video image. One method for achieving this is using multiple sets of units for transmitting and receiving video signals (i.e. transmitters and receivers) and multiple transmission cables as illustrated in FIG. 2B. However, this method requires sets of hardware as many as the cameras, accordingly incurring cost.

Another method is multiplexing a plurality of video signals as illustrated in FIG. 2C. Transmitters (or serializers) used with GVIF have the function of multiplexing video signals, and they can transmit video signals output from a plurality of cameras simultaneously using this function. The transmitters transmit a plurality of video signals sequentially by time-division. The multiplexed video signals can be separated by receivers (or deserializers).

The term "multiplexing" used in this disclosure refers to processing performed to transmit a plurality of video signals sequentially through a single transmission line. An example of such processing is the processing of switching the sources of video signals on a frame-by-frame basis (frame interleaving) or the processing of switching the sources of video signals on a line-by-line basis (line interleaving).

However, the above method has a disadvantage. The transmitter used with GVIF cannot add more than one video signal to an existing video signal. Thus, when video signals produced by three cameras are to be transmitted, it is necessary to prepare three transmitters and three receivers. This leads to increased cost disadvantageously.

MIPI (Mobile Industry Processor Interface, registered trademark) is another video transmission standard. It is possible to multiplex a plurality of video signals also based on MIPI. FIG. 3 is a diagram schematically illustrating a system that multiplexes video signal based on MIPI. For example, there is a known transmitter capable of converting a plurality of (at most four lanes of) video signals based on MIPI into a serial signal.

In the case where this method is employed, increases in the number of simultaneously-transmitted video signals put strain on the bandwidth allotted to each video signal, leading to deteriorated quality.

FIGS. 4A and 4B show an exemplary image displayed by the on-vehicle terminal 20 when the vehicle moves backward. When the vehicle moves backward, a video image captured by the rear camera is output sometimes as shown in FIG. 4A. In this case, the number of video signals to be transmitted is one. There are also cases where video images captured by a plurality of cameras are transmitted simultaneously in order to create an all-around video image in addition to the video image captured by the rear camera as shown in FIG. 4B. In this case, the number of video signals to be transmitted is four. In consequence, the bandwidth allotted to one camera varies depending on the scheme of image display.

For the sake of safety, it is desirable that transmission of the video image captured by the rear camera be given high priority. However, in the case where the all-around video image is displayed by the above method, the bandwidth available for the video image captured by the rear camera is small. Small bandwidth leads to disadvantages, such as low frame rate, deteriorated image quality, and/or video freeze, which can cause safety issues.

Moreover, the MIPI standard suffers from the problem that stable transmission cannot be achieved in the case where video images of different resolutions and/or different frame rates are multiplexed. This means that it is not appropriate to use a high resolution camera only for the rear camera.

Figure 6:
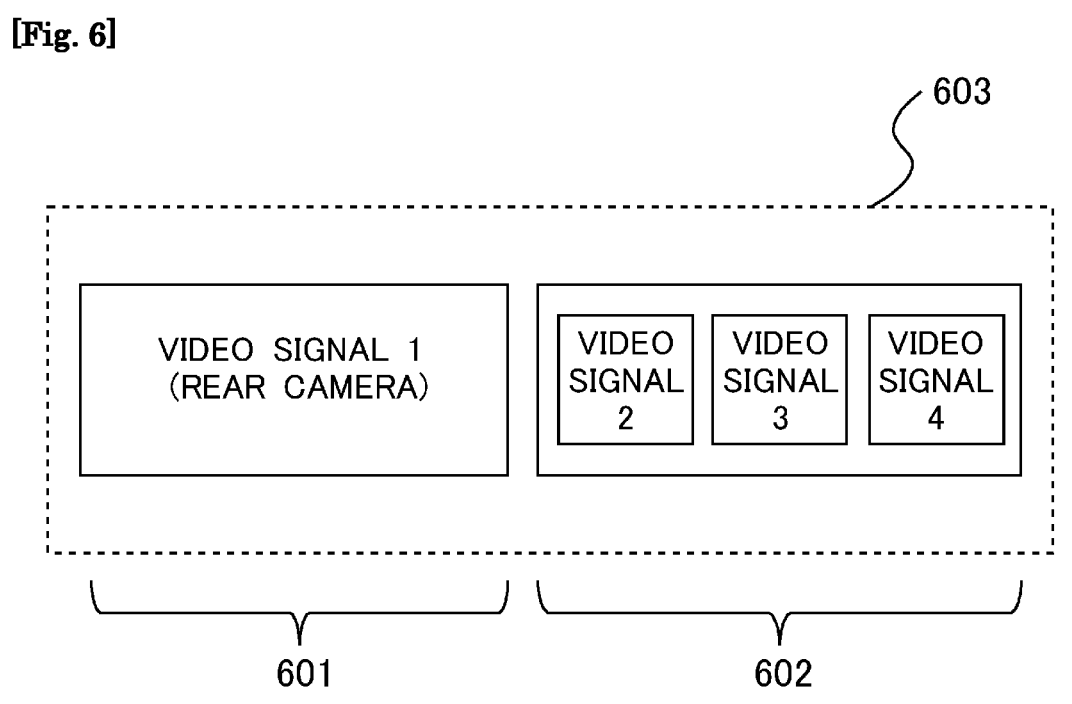

To solve the above problems, the video transmission system according to this embodiment is configured to multiplex video signals produced by a plurality of cameras using a transmitter based on MIPI and to further multiplex the multiplexed video signal using a transmitter based on GVIF. FIG. 5 is a diagram schematically illustrating processing performed by the video transmission system according to the embodiment. FIG. 6 is a diagram illustrating the bandwidths in transmission of video signals.

In FIG. 6, video signal 1 is a signal output from the aforementioned rear camera (i.e. the video signal to which high priority is assigned), and video signals 2 to 4 are signals output from other cameras (e.g. front and side cameras).

Since the number of video signals that can be multiplexed by one transmitter based on GVIF is at most two, the bandwidths are allotted in a manner indicated by reference numerals 601 and 602. In other words, it is possible to allocate, at least, the bandwidth indicated by reference numeral 601 to video signal 1 (i.e. the video signal output from the rear camera).

Since video signals multiplexed based on one standard (MIPI) is further multiplexed based on another standard (GVIF), it is possible to mixedly multiplex video signals of different resolutions and/or different frame rates.

Next, components of the vehicle 100 will be described specifically.

FIG. 7 is a block diagram schematically illustrating an exemplary configuration of the vehicle 100 illustrated in FIG. 1. The vehicle 100 has the ECU 10 and the on-vehicle terminal 20. These components are interconnected by a cable for transmitting video signals and a cable for transmitting control signals. While only the ECU 10 and the on-vehicle terminal 20 are mentioned in this description as components of the vehicle 100, the vehicle 100 may be provided with a plurality of electronic control units (such as an engine ECU and a body ECU) that control operations of the vehicle 100.

Firstly, the ECU 10 will be described.

The ECU 10 is an electronic control unit that processes video signals generated by the plurality of cameras provided on the vehicle 100. The ECU 10 is also referred to as the camera ECU. The ECU selects a video signal/signals and provides it/them in response to a request made by another electronic control unit or the on-vehicle terminal 20. While the ECU 10 according to the embodiment processes only video images captured by the cameras, the ECU 10 may be configured to execute other processing (e.g. autonomous driving or drive assist) based on video images captured by the cameras. In that case, the ECU 10 may be called ADAS-ECU.

The ECU 10 includes a control unit 11, a storage unit 12, a communication unit 13, and a video interface 14.

The control unit 11 is a computational unit that executes specific programs to implement various functions of the ECU 10. The control unit 11 may be implemented by a CPU or the like.

The control unit 11 executes the processing of selecting video signals generated by a plurality of cameras in response to a command received from outside (typically from the on-vehicle terminal 20) and transmitting them. For example, when the on-vehicle terminal 20 requests a panorama video of the environment all around the vehicle 100, the control unit 11 selects cameras for creating the panorama video and transmits video signals output from the selected cameras to the on-vehicle terminal 20.

Details of the processing executed by the control unit 11 will be described later.

The storage unit 12 is a memory apparatus including a main storage device and an auxiliary storage device. In the auxiliary storage device are stored an operating system (OS), various programs, and various tables. Various functions for achieving desired purposes that will be described later can be implemented by loading programs stored in the auxiliary storage device to the main storage device and executing them.

The communication unit 13 is an interface unit used to connect the ECU 10 with the on-vehicle terminal 20. The ECU 10 and the on-vehicle terminal 20 according to the embodiment are connected by two lines, one for transmitting video signals and the other for transmitting control signals. Examples of the line for transmitting video signals include a twisted pair cable and a coaxial cable. Since the system according to the embodiment performs multiplexed transmission of video signals of a plurality of channels, the number of cables used for video transmission is one. An example of the line for transmitting control signals is an on-vehicle network. Specifically, control signals can be transmitted using a network based on CAN (Controller Area Network) or a network based on Ethernet (registered trademark). The line used to transmit control signals may be shared with other ECU or devices.

The communication unit 13 is an interface connected with the aforementioned lines. The communication unit 13 may include a hardware interface used to transmit video signals and a hardware interface used to transmit control signals (e.g. CAN controller).

The video interface 14 is an interface unit for connection to the cameras provided on the vehicle. The video interface 14 according to the embodiment receives video signals based on MIPI (e.g. MIPI CSI-2) from the cameras.

The cameras 30A to 30E are provided on the vehicle 100. Examples of the cameras provided on the vehicle 100 include a camera for recording (by a drive recorder), a camera for autonomous driving, a camera for safety check by the driver, and a camera for monitoring the driver. The positions of the cameras in the vehicle 100 may be, for example, front, front side, side, and rear. In the exemplary configuration illustrated in FIG. 7, the vehicle 100 is provided with a rear camera 30A, a front camera 30B, and side cameras 30C, 30D, and 30E. The rear camera 30A is used for the purpose of safety check during backward movement. The front camera 30B is used for drive assist and/or recoding by a drive recorder. The side cameras 30C, 30D, and 30E are used to see blind spots. Moreover, an all-around video image can be created using video images produced by these cameras.

These cameras are connected with the ECU 10 based on MIPI (e.g. MIPI CSI-2)

Next, functions of the control unit 11 will be described.

FIG. 8 is a diagram illustrating functional modules of the control unit 11 and data flows between modules. The functional modules shown in FIG. 8 can be implemented by executing programs stored in storage means, such as a ROM, by a CPU or the like. The control modules of the control unit 11 include a video selector 111, an image processor 112, a first multiplexer 113, and a second multiplexer 114.

A plurality of video signals received through the video interface 14 are firstly input to the control unit 11. In the description of this embodiment, the video signal received from the rear camera 30A will be referred to as the first camera signal. The video signals received from the other cameras 30B to 30E will be referred to as the second camera signals. The first camera signal is the video signal to which the highest priority is assigned in the system according to the embodiment. This is because the first camera signal is the signal of the video image of the scene behind the vehicle, which should be transmitted on a real-time basis. For example, if frame drops occur in the video while the vehicle is moving backward, there is a possibility that a walker passing behind the vehicle fails to be recognized. In contrast, the second camera signals are used to create an auxiliary video image (namely, the all-around video image), and their priority is lower than the first camera signal.

While the first camera signal is always transmitted to the on-vehicle terminal 20, the second camera signals are selected fitly on the basis of commands from the on-vehicle terminal 20. For example, when the video of a side camera is required by the on-vehicle terminal 20, only the video signal output from the side camera is selected.

The video selector 111 selects camera signals to be transmitted from among the second camera signals. The on-vehicle terminal 20 according to the embodiment sends data (or "selection data" indicated in FIG. 8) that designates cameras to the video selector 111, and the video selector 111 selects video signals from among the second camera signals. FIG. 9A illustrates an example of the selection data.

For example, in cases where the on-vehicle terminal 20 sends selection data requiring video images for creating the all-around video image, the video selector 111 selects second camera signals used to create the all-around video image.

The system according to the embodiment multiplexes the first camera signal and the second camera signals selected by the video selector 111.

The image processor 112 applies processing to the second camera signals to be multiplexed. For example, the image processor 112 performs the processing of making the resolutions and/or the frame rates of the second camera signals uniform. When video signals based on e.g. MIPI are to be multiplexed, it is desirable in order to smooth the transmission speed that the resolutions and/or the frame rates of all the video signals be made uniform. The resolution may be adjusted by enlarging or reducing the images, or adding an extra area to or clipping the images.

The processing performed by the image processor 112 is not limited to processing for multiplexing of video images. For example, the image processor 112 may executes the processing of changing the frame rate of videos taking account of the light emission cycle of LED traffic lights. For example, in the case where the light emission cycle is 60 Hertz, the image processor 112 may execute the processing of changing video signals of 30 fps into video signals of 29 fps.

The first multiplexer 113 executes the processing of multiplexing the plurality of second camera signals selected by the video selector 111. Thus, the plurality of video signals are converted into a single video signal including a plurality of lanes. Selection of second camera signals and multiplexing of the selected signals may be performed as desired within specifications of the standard of the video signals (e.g. within the maximum bit rate). The signal after conversion may be, for example, a CSI-2 signal.

The second multiplexer executes the processing of multiplexing the video signal produced by multiplexing by the first multiplexer 113 and the first camera signal. Thus, a video signal having a nested structure as illustrated in FIG. 6 can be produced. Video signals 1 to 4 in FIG. 6 are signals based on MIPI, and the video signal produced by the second multiplexer 114 (i.e. the video signal designated by reference numeral 603) is a signal based on GVIF.

The video signal produced by the second multiplexer 114 is transmitted to the on-vehicle terminal 20.

Next, the on-vehicle terminal 20 will be described with reference to FIG. 7.

The on-vehicle terminal 20 is an apparatus that provides information to the occupants of the vehicle 100. This apparatus is also referred to as a car navigation system, an infotainment system, or a head unit. The on-vehicle apparatus 20 can provide navigation and/or entertainment to the occupants of the vehicle 100. The on-vehicle apparatus 20 may have the functions of downloading traffic information, road map data, music, and/or video through communication with a network outside the vehicle 100.

The on-vehicle terminal 20 may be constituted of a general-purpose computer. Specifically, the on-vehicle terminal 20 may be constructed as a computer having a processor, such as a CPU and/or a GPU, a main storage device, such as a RAM and/or a ROM, and an auxiliary storage device, such as an EPROM, a hard disk drive, and/or a removable medium. In the auxiliary storage device are stored an operating system (OS), various programs, and various tables. Various functions for achieving desired purposes that will be described later can be implemented by executing programs stored in the auxiliary storage device. Some or all of such functions may be implemented by a hardware circuit(s), such as an ASIC(s) and/or an FPGA(s).

The on-vehicle terminal 20 has a control unit 21, a storage unit 22, a communication unit 23, and an input and output unit 24.

The control unit 21 is means for controlling the on-vehicle apparatus 20. The control unit 21 is composed of an information processing unit, such as a CPU (Central Processing Unit) or a GPU (Graphics Processing Unit).

The control unit 21 provides information to the occupants of the vehicle. Examples of the provided information include traffic information, navigation information, music, video, radio broadcast, and digital television broadcast. The control unit 21 outputs information through the input and output unit 24.

The control unit 21 further has the function of providing drive assist using the on-vehicle cameras. Examples of the drive assist using the on-vehicle cameras include monitoring behind the vehicle during its backward movement and monitoring traffic conditions on the right and left of the vehicle at an intersection with low visibility. When providing drive assist using the on-vehicle cameras, the control unit 21 requests the ECU 10 to transmit a video image. The control unit 21 may execute the processing of creating an image to be output or the processing of creating a user interface screen using the video signal transmitted from the ECU 10.

Details of the processing executed by the control unit 21 will be described later.

The storage unit 22 is means for storing information. The storage unit 22 includes a storage medium, such as a RAM, a magnetic disk, or a flash memory. In the storage unit 22 are stored various programs to be executed by the control unit 21 and data used by the programs.

The communication unit 23 is an interface unit used to connect the on-vehicle terminal 20 with the ECU 10. As with the communication unit 13 of the ECU 10, the communication unit 23 includes an interface to a line for transmitting video signals and an interface to a line for transmitting control signals. The interface to the line for transmitting video signals may be, for example, a twisted pair cable or a coaxial cable. The interface to the line for transmitting control signals may be, for example, a CAN (Controller Area Network).

The input and output unit 24 is means for receiving input operations conducted by the user and providing information to the user. Specifically, the input and output unit 24 includes a touch panel, a controller for the touch panel, a liquid crystal display, and a controller for the liquid crystal display. The touch panel and the liquid crystal display of the input and output unit 24 according to the embodiment are composed of a touch panel display. The input and output unit 24 may include a speaker for outputting sounds.

Next, functions of the control unit 21 will be described.

FIG. 10 is a diagram illustrating functional modules of the control unit 21 and data flows between modules. The functional modules shown in FIG. 10 can be implemented by executing programs stored in storage means, such as a ROM, by a CPU or the like. The control modules of the control unit 21 include a selector 211, a first demultiplexer 212, a second demultiplexer 213, and an information provider 214.

The selector 211 transmits data (or selection data) designating cameras by which video images are to be captured to the ECU 10.

The selector 211 determines cameras to capture video images requested to be transmitted from the ECU 10 on the basis of an operation conducted by the driver. For example, during backward movement of the vehicle 100, the video image captured by the rear camera is output in some cases, as illustrated in FIG. 4A. In that case, the rear camera is selected. Alternatively, during backward movement of the vehicle 100, the video image captured by the rear camera and the all-around video image are output in cases, as illustrated in FIG. 4B. In that case, all the cameras for monitoring the outside including the rear camera are selected.

The cameras to be used may be determined based on an operation conducted by the driver or on the status of the vehicle 10. For example, when the gear is in the reverse position, the cameras used during backward movement may be selected. The on-vehicle terminal 20 may store data that links the status (or mode) of the vehicle and cameras to be used and use this data in creating the selection data. For example, the selector 211 may create the selection data based on the data illustrated in FIG. 11. Such data may be stored in the storage unit 22.

The first demultiplexer 212 receives the video signal transmitted from the ECU 10 through the communication unit 23 and demultiplexes the video signal. As described above with reference to FIG. 6, the video signal transmitted between the ECU 10 and the on-vehicle terminal 20 is a signal based on GVIF, and two video signals based on MIPI (signals designated by reference numerals 601 and 602 in FIG. 6) can be produced by demultiplexing this video signal. Among the video signals separated by demultiplexing, the first camera signal 601 (namely, the video signal produced by the rear camera) is transmitted to the information provider 214. The video signal 602 other than the first camera signal is transmitted to the second demultiplexer 213.

The second demultiplexer 213 demultiplexes the video signal transmitted from the first demultiplexer 212 to produce a plurality of second camera signals. The second camera signals are transmitted to the information provider 214 as with the first camera signal.

The information provider 214 creates a user interface screen to be provided to the occupant (or the driver) of the vehicle on the basis of the first camera signal and the second camera signals. For example, the information provider 214 fits the images captured by the cameras into a predetermined graphic and outputs it. In this connection, guide lines indicating the position of the vehicle, the expected path of the vehicle or the like may be superimposed on the images. The information provider 214 may also execute the processing of creating a single image (e.g. an all-around video image) based on the video images captured by multiple cameras.

(Procedure of Processing)

FIG. 12 is a flow chart of processing executed by the ECU 10 and the on-vehicle terminal 20.

Firstly, in step S11, the selector 211 determines cameras to be used to capture video images. This step may be executed when a specific operation is conducted by the driver or when a specific status of the vehicle is established. The selector 211 determines cameras to be used based on the operation by the driver or the status of the vehicle and sends data (selection data) designating the cameras to the ECU 10.

In step S12, the ECU 10 (specifically, video selector 111) determines one or more cameras by which video signals are to be produced on the basis of the selection data and selects video signals from the cameras. The selected video signals (or the second camera signals) are transferred to the image processor 112.

In step S13, the image processor 112 executes preliminary processing for multiplexing of the video signals. Specifically, the image processor 112 applies the processing of converting the frame rate and resolution to the second camera signals. Processing other than the above that serves as preliminary processing for multiplexing of the video signals may also be executed in this step. If preliminary processing is not necessary, this step may be eliminated. The second camera signals after the processing by the image processor 112 are transferred to the first multiplexer 113.

Then in step S14, the first multiplexer 113 multiplexes the second camera signals input to it to produce a single video signal.

Then in step S15, the second multiplexer 114 multiplexes the second camera signal multiplexed by the first multiplexer 113 and the first camera signal. The video signal after multiplexing is transmitted to the on-vehicle terminal 20 through the interface for transmitting video signals.

In step S16, the first demultiplexer 212 demultiplexes the video signal it receives to produce the first camera signal. The video signal after the multiplexing is transferred to the second demultiplexer 213. In step S17, the second demultiplexer demultiplexes the transferred video signal to produce the second camera signals. The first camera signal and the second camera signals are transferred to the information provider 214.

The information provider 214 provides information to the occupant of the vehicle using the first camera signal and the second camera signals it receives.

As above, the ECU 10 according to the embodiment multiplexes video signals produced by a plurality of cameras in multi-stages based on two different video transmission standards. This enables multiplexed transmission of a plurality of video signals while meeting quality requirements placed on a specific video signal. Moreover, it is possible to make the resolution and/or the frame rate of the video signal on which quality requirements are placed higher than the other video signals.

Second Embodiment

While the system according to the first embodiment is configured to give higher priority to the video signal produced by the rear camera in transmission, the video signal to which higher priority is given (or the video signal processed as the first camera signal) may be designated externally of the ECU 10.

According to the second embodiment described in the following, the on-vehicle terminal 20 designates the degrees of priority of respective video signals for the ECU 10.

FIG. 13 is a diagram illustrating the configuration of modules of the ECU 10 (or the control unit 11) according to the second embodiment. The second embodiment differs from the first embodiment in that the video selector 111 selects both the first and second camera signals and that the selection data the on-vehicle terminal 20 transmits includes the designation of degrees of priority.

FIG. 9B illustrates an example of the selection data according to the second embodiment. The selection data according to the second embodiment is data that links degrees of priority with cameras to be used. In the illustrative case shown in FIG. 9B, it is designated that the camera to which the highest priority is given is the rear camera. In consequence, the first camera signal is the video signal produced by the rear camera. The second camera signals are video signals produced by the other cameras.

The video selector 111 selects video signals based on the selection data and determines the destinations to which the video signals are to be transmitted based on the degrees of priority. Specifically, the video signal of the camera to which the highest priority is given is transmitted to the second multiplexer 114 as the first camera signal, and the other video signals are transmitted to the first multiplexer 113 as the second camera signals.

The processing executed thereafter is the same as that according to the first embodiment.

As above, according to the second embodiment, it is possible to dynamically designate the degrees of priority of video signals. Therefore, it is possible to use the video signals in various manners. For example, when the vehicle is moved backward, higher priority may be given to the video signal of the rear camera, and when the vehicle comes close to another vehicle on an adjacent lane, higher priority may be given to the video signals of the side cameras.

Modifications

The above embodiments have been described only by way of example. The technology disclosed herein can be implemented in modified manners without departing from the essence of this disclosure.

For example, processing and features that have been described in this disclosure may be employed in any combination so long as it is technically feasible to do so.

While the cameras used in the systems according to the above-described embodiments output video signals based on MIPI, the video signals output by the cameras may be based on other standards.

While the systems according to the above-described embodiments transmit video signals based on GVIF between the ECU 10 and the on-vehicle terminal 20, other standards may be used in video transmission between apparatuses. It is preferred that the standard that can be used satisfy at least one of the following conditions (1) to (3).

(1) The standard can assure that at least one video signal transmitted by multiplexed transmission meets a specific quality requirement.

An example of the specific quality requirement is real-time requirement, which enables real-time transmission of the first camera signal.

(2) The standard allows that a bandwidth equal to or larger than a specific value is allocated to at least one video signal transmitted by multiplexed transmission.

If this condition is met, it is possible to allocate a bandwidth equal to or larger than the specific value to the first camera signal and to allocate the remaining bandwidth to the second camera signals.

(3) The standard allows mixed use of video signals of different resolutions and different frame rates.

One or some of the processes that have been described as processes performed by one apparatus may be performed by a plurality of apparatuses in a distributed manner. One or some of the processes that have been described as processes performed by two or more apparatuses may be performed by one apparatus. The hardware configuration (or the server configuration) employed to implement various functions in a computer system may be modified flexibly.

The technology disclosed herein can be implemented by supplying a computer program(s) (i.e. information processing program) that implements the functions described in the above description of the embodiment to a computer to cause one or more processors of the computer to read and execute the program(s). Such a computer program(s) may be supplied to the computer by a computer-readable, non-transitory storage medium that can be connected to a system bus of the computer, or through a network. Examples of the computer-readable, non-transitory storage medium include any type of discs including magnetic discs, such as a floppy disc (registered trademark) and a hard disk drive (HDD), and optical discs, such as a CD-ROM, a DVD, and a Blu-ray disc, a read-only memory (ROM), a random access memory (RAM), an EPROM, an EEPROM, a magnetic card, a flash memory, an optical card, and any type of medium that is suitable for storage of electronic commands.

What is claimed is:

1. A video transmission system which is applied to a vehicle, the video transmission system comprising:

a first transmitter that multiplexes two or more first video signals using a first video transmission standard to produce a second video signal;

a second transmitter that multiplexes a third video signal and the second video signal using a second video transmission standard different from the first video transmission standard to produce a fourth video signal;

a first receiver that receives the fourth video signal transmitted through a single cable and separates the second video signal and the third video signal; and a second receiver that demultiplexes the second video signal to separate the two or more first video signals, wherein the third video signal is a video signal that is required to meet a real-time requirement, and the third video signal is a video signal produced by a rear camera of the vehicle, the first video signals are video signals produced by cameras disposed at positions other than rear of the vehicle, equal to or larger than a specific value of bandwidth is allocated to the third video signal, and the remaining bandwidth is allocated to the second video signal containing the two or more first video signals, and the second video transmission standard is a standard that can assure the real-time requirement, and the second video transmission standard is a standard that allows that the bandwidth equal to or larger than a specific value is allocated to the third video signal.

2. A video transmission system according to claim 1, wherein the third video signal is a single video signal, and a number of the first video signals contained in the second video signal is determined based on a designation supplied from outside.

3. A video transmission system according to claim 1, wherein the first and second transmitters are included in a specific electronic control unit provided on the vehicle.

4. A video transmission system according to claim 3, wherein the first and second receivers are included in an on-vehicle apparatus provided on the vehicle.

5. A video transmission system according to claim 4, wherein the on-vehicle apparatus sends first data designating two or more cameras that produce the first video signals to the electronic control unit, and the first transmitter included in the electronic control unit multiplexes the first video signals produced by the two or more cameras designated by the first data.

6. A vehicle comprising:

a plurality of cameras that capture images of scenes outside the vehicle;

a first apparatus that multiplexes two or more first video signals using a first video transmission standard to produce a second video signal and multiplexes a third video signal and the second video signal using a second video transmission standard different from the first video transmission standard to produce a fourth video signal; and a second apparatus that receives the fourth video signal transmitted through a single cable, separates the second video signal and the third video signal, and demultiplexes the second video signal to separate the two or more first video signals, wherein the third video signal is a video signal that is required to meet a real-time requirement, and the third video signal is a video signal produced by a rear camera of the vehicle, the first video signals are video signals produced by cameras disposed at positions other than rear of the vehicle, equal to or larger than a specific value of bandwidth is allocated to the third video signal, and the remaining bandwidth is allocated to the second video signal containing the two or more first video signals, and the second video transmission standard is a standard that can assure the real-time requirement, and the second video transmission standard is a standard that allows that the bandwidth equal to or larger than a specific value is allocated to the third video signal.

7. A vehicle according to claim 6, wherein the first apparatus is an electronic control unit that controls the plurality of cameras, and the second apparatus is an on-vehicle terminal.

8. A video transmission method which is applied to a vehicle, the video transmission method comprising:

a first step of multiplexing two or more first video signals using a first video transmission standard to produce a second video signal;

a second step of multiplexing a third video signal and the second video signal using a second video transmission standard different from the first video transmission standard to produce a fourth video signal;

a third step of transmitting the fourth video signal through a single cable;

a fourth step of receiving the fourth video signal and separating the second video signal and the third video signal; and a fifth step of demultiplexing the second video signal to separate the two or more first video signals, wherein the third video signal is a video signal that is required to meet a real-time requirement, and the third video signal is a video signal produced by a rear camera of the vehicle, the first video signals are video signals produced by cameras disposed at positions other than rear of the vehicle, equal to or larger than a specific value of bandwidth is allocated to the third video signal, and the remaining bandwidth is allocated to the second video signal containing the two or more first video signals, and the second video transmission standard is a standard that can assure the real-time requirement, and the second video transmission standard is a standard that allows that the bandwidth equal to or larger than a specific value is allocated to the third video signal.

9. A video transmission method according to claim 8 further comprising the step of simultaneously outputting the third video signal after the separation and the two or more first video signals after the separation.

* * * * *